United States Patent [19]

Chujo

[11] Patent Number: 4,991,562
[45] Date of Patent: Feb. 12, 1991

[54] MECHANICAL SUPERCHARGER SYSTEM
[75] Inventor: Masaki Chujo, Chiryu, Japan
[73] Assignee: Aisin Seiki Kabushiki Kaisha, Kariya, Japan
[21] Appl. No.: 412,177
[22] Filed: Sep. 25, 1989
[30] Foreign Application Priority Data Sep. 28, 1988 [JP] Japan .................... 63-126699

[51] Int. Cl.⁵ .......................................... F02D 23/00
[52] U.S. Cl. .................... 123/564; 251/61.5; 417/310
[58] Field of Search .............. 60/609, 611; 123/564; 251/61.5; 137/907; 417/310

[56] References Cited

U.S. PATENT DOCUMENTS

| 3,437,265 | 4/1969 | Rohde | 417/310 X |
| 4,502,283 | 3/1985 | Wandel | 123/564 X |
| 4,517,803 | 5/1985 | Jamison | 60/611 |
| 4,656,992 | 4/1987 | Oonaka et al. | 123/564 X |
| 4,763,636 | 8/1988 | Tamura et al. | 123/564 |
| 4,823,758 | 4/1989 | Tamura et al. | 123/564 |

FOREIGN PATENT DOCUMENTS

| 57732 | 4/1987 | Japan . |
| 69794 | 5/1988 | Japan . |
| 83423 | 6/1988 | Japan . |
| 128240 | 8/1988 | Japan . |
| 183428 | 11/1988 | Japan . |
| 183429 | 11/1988 | Japan . |
| 91042 | 6/1989 | Japan . |
| 136628 | 9/1989 | Japan . |

*Primary Examiner*—Michael Koczo
*Attorney, Agent, or Firm*—Oblon, Spivak, McClelland, Maier & Neustadt

[57] ABSTRACT

A mechanical supercharger has a by-pass structure in the form of a valve body unitarily fixed to the supercharger housing at an end thereof opposite the drive gears for synchronously rotating the rotor shafts. The valve body contains a by-pass passage which is normally closed by a valve and which fluidically connects the outlet and the inlet of the compressor for permitting compressed gas to return to the inlet. The valve is slidably mounted on a shaft and is normally biased into the closed position by a spring, so that the valve will open the by-pass when the compressed gas pressure exceeds the spring force. The shaft itself is mounted to a diaphragm mechanism which can retract the shaft and open the valve in response to a pressure signal to the valve when supercharging is not necessary. Engine wear and fuel consumption are thus improved.

3 Claims, 4 Drawing Sheets

MECHANICAL SUPERCHARGER SYSTEM

BACKGROUND OF THE INVENTION

1. Field of the Invention

The present invention is concerned with a mechanical supercharger system to be used in an internal combustion engine.

2. Description of the Related Art

In an engine system with a mechanical supercharger the increased supercharge pressure has generally bad effects upon the longevity of the engine and the supercharger, and the driving load of the supercharger during running increases the fuel consumption. In order to minimize these conditions a by-pass valve system has been used so as to by-pass compressed air back to the suction inlet of the supercharger. However the by-pass valve system with by-pass pipes needs a large space and has been difficult to mount on the engine. Even if such mounting is possible, the pipes are long, and consequently the supercharger is not efficiently used.

A conventional turbo-supercharger with an air by-pass system (FIG. 4) is described in Japanese application JITSU-KAI-SHO 63-90033. There an air by-pass system of the supercharger 51 which by-passes the air downstream from the compressor 50 to a point upstream therefrom at the initial period of speed reduction includes a by-pass 52 and a by-pass valve 53 selectively closing the by-pass 52. A diaphragm 55 operates the by-pass valve 53 so as to open and close the by-pass valve in proportion to the pressure difference between the front and the back of the throttle valve 54. A relief passage 56 leaks pressure from a point downstream of the throttle valve 54 to the engine intake.

Because the by-pass valve 53 is separated from the supercharger to create two bodies, a large space is needed for the air passages. Therefore it is difficult to mount the system on the engine. Further because of the long length of the air passages, the air pressure losses increase. Therefore, when driving, the reduction of the driving load loss attributable to the supercharger which is made possible by the by-pass, is limited. Consequently, fuel consumption is made worse. Furthermore, resonance pulses in the long air by-pass passages case the flow resistance in the air by-pass passages to change cyclically. The pulsations have a bad effect upon the longevity of the valve seal of the by-pass valve and the spring.

The conventional mechanical supercharger in FIG. 5 is described in the Japanese application JITSU-KAI-SHO 63-11373. There, in the interior of the body 58 including the air compressor 57 for the charging air into the engine, a by-pass is provided so as to communicate between points upstream and downstream of the compressor 57. A control valve 59 is provided to open and close the by-pass. However, because of the length of the by-pass, the passage resistance increases, and consequently the fuel consumption is made worse.

SUMMARY OF THE INVENTION

It is an object of the invention to provide a mechanical supercharger system which needs only a small space and improves fuel consumption.

It is another object of the invention to provide a mechanical supercharger system which has a long-life characteristic.

The above, and other, objects are accomplished according to the present invention by a mechanical supercharger including a supercharger housing defining a working volume and having an inlet and an outlet, compressing means in the working volume and comprising means for compressing a gas between the inlet and the outlet, and by-pass means for selectively by-passing a compressed gas from the outlet back to the inlet. The by-pass means comprises a valve body unitarily fixed to the supercharger housing so as to form a single body and having a by-pass passage fluidically connected between the outlet and the inlet for permitting compressed gas to flow from the outlet to the inlet, a normally closed valve in the by-pass body for closing the fluid communication between the outlet and the inlet via the by-pass passage, and diaphragm means for selectively opening the valve so as to open the by-pass passage.

According to a further feature of the invention, a spring biases the valve in the normally closed position so that the valve opens independently of the diaphragm when an opening force on the valve due to a pressure of the compressed gas at the outlet exceeds a closing force of the spring.

According to a further feature of the invention, a headed shaft is fixed to the diaphragm. The valve is freely slidably mounted to the shaft so that the valve slides on the shaft to open when the opening force exceeds the closing force of the spring. The diaphragm retracts the shaft such that the valve is engaged by the head of the shaft to open the valve.

According to yet a further feature of the invention, the compressing means comprise two parallel shafts extending through the supercharger housing and being rotationally mounted thereto, one end of each of the shafts extending to the valve body. Meshing rotors are mounted on the shafts and meshing gears are mounted to the other end of the shafts for synchronously rotating the shafts. The positioning of the meshing gears opposite the valve body minimizes the length of the by-pass.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
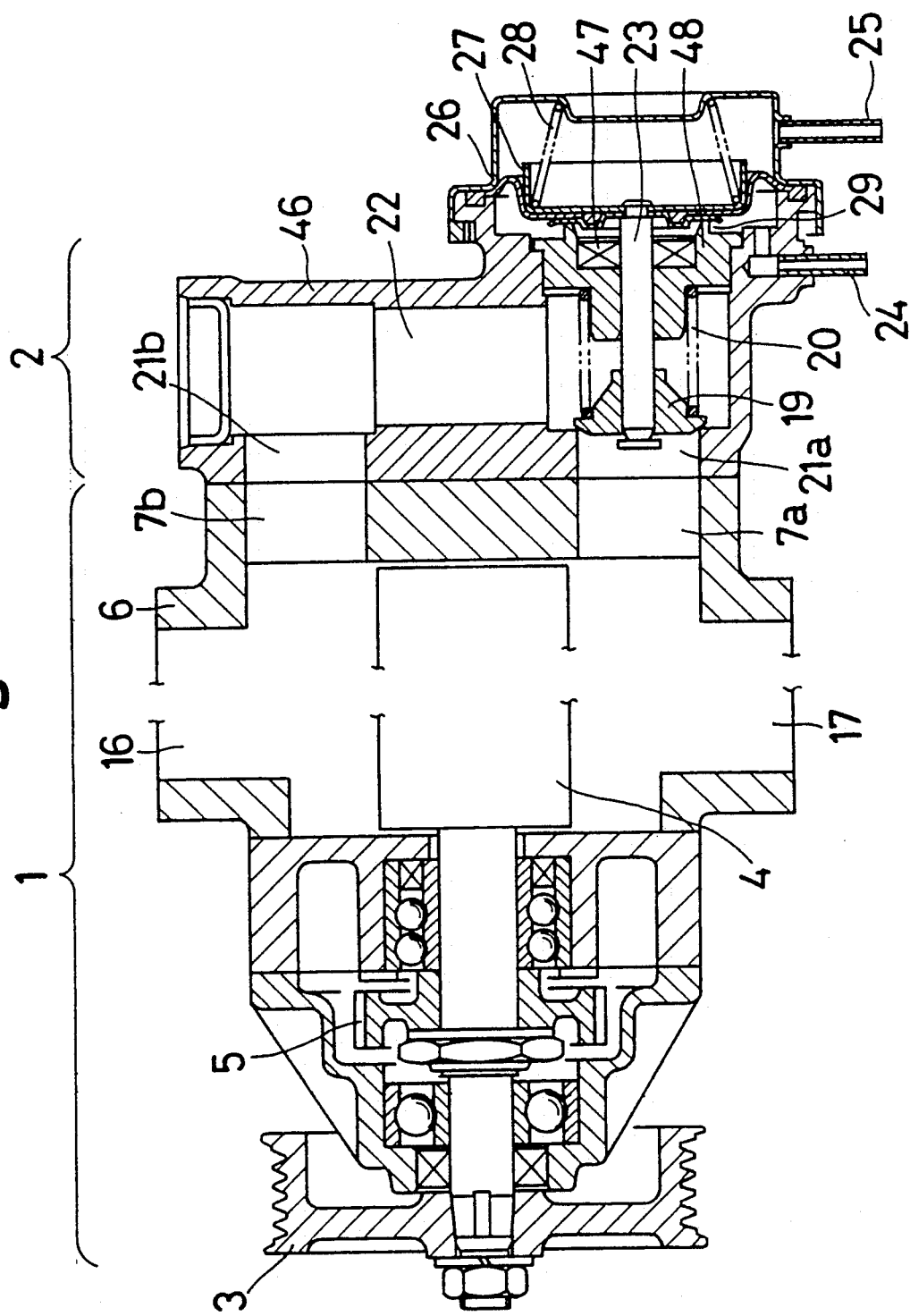
FIG. 1 shows a top plan sectional view of a mechanical supercharger system of an embodiment of the invention.
Figure 2:
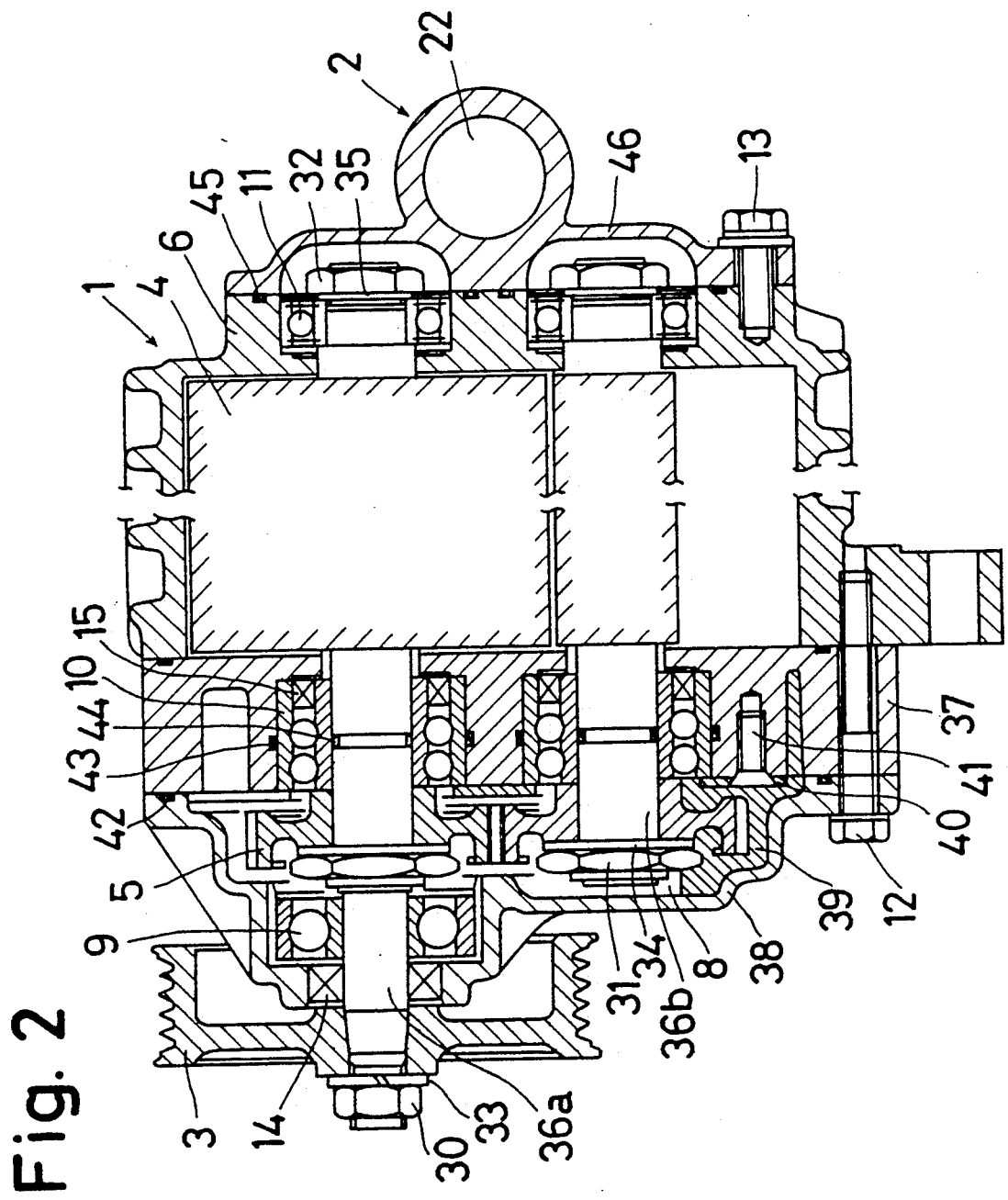
FIG. 2 shows a side sectional view of the embodiment of FIG. 1.
Figure 3:
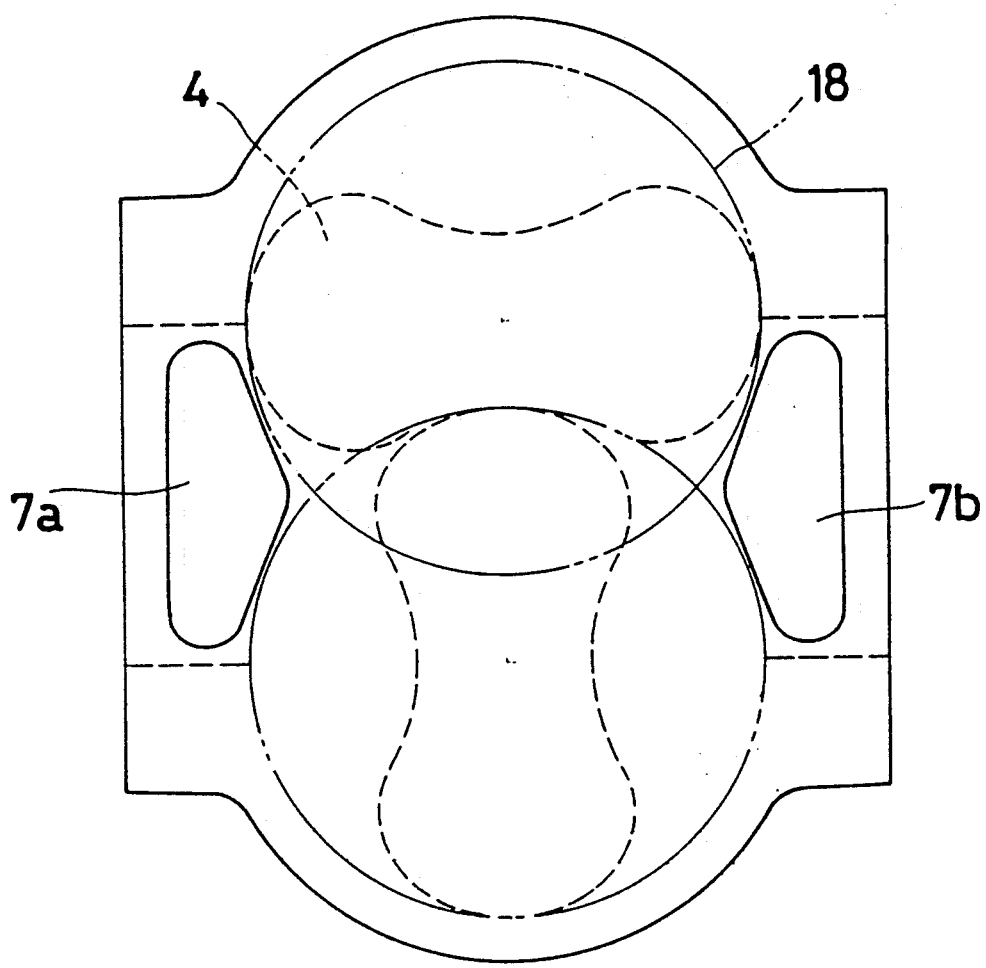
FIG. 3 shows an end view of the embodiment of FIG. 1 with the by-pass valve structure removed.
Figure 4:
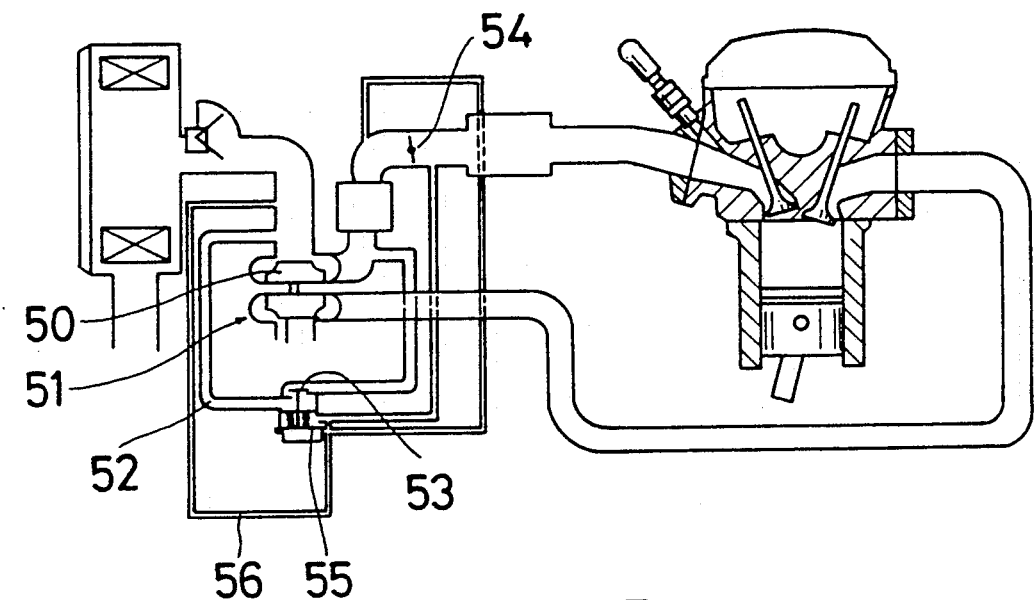
FIG. 4 shows a sectional view of a conventional turbo-supercharger system.
Figure 5:
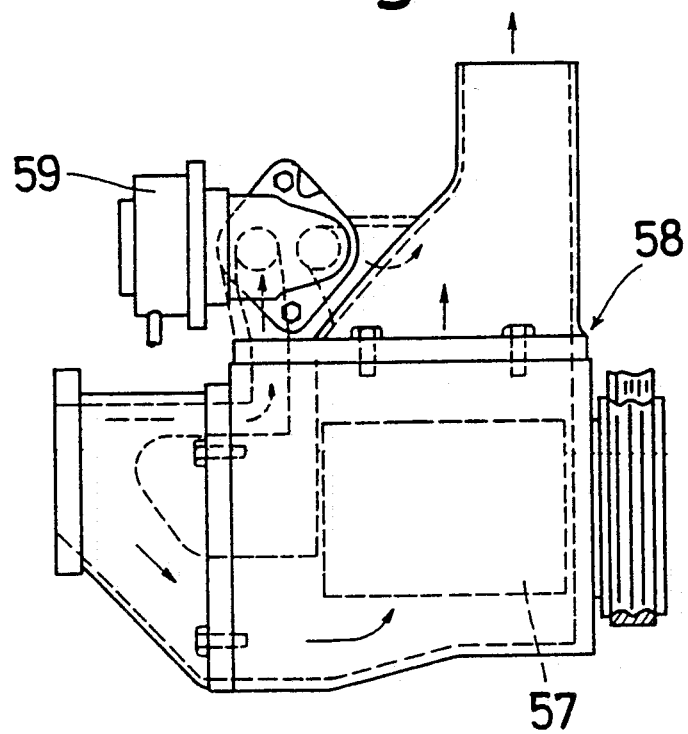
FIG. 5 shows a front view of a conventional mechanical supercharger system.

In FIGS. 1 to 3, a by-pass valve structure 2 is attached to one end of a mechanical supercharger 1 at an end of the supercharger opposite a pulley 3 which is mounted on a shaft 36a by a nut 30 and washer 33, and is driven by the engine. Timing gears 5 are mounted on the shafts 36a and 36b at the same end as is the pulley 3 in relation of the rotors 4, by the nuts 31 and washers 34 and extend into the lubricating oil 39 in the gear space 8. On the opposite side are formed by-passes 7a, 7b. If the timing gears 5 were instead mounted on the opposite side, then the by-passes 7a, 7b must be extended by the length of the gear space 8, which increases the by-pass resistance.

Bearings 9, 10 and 11 rotatably support the driving shaft 36a and the driving shaft 36b and are mounted thereto via the nuts 32 and washers 35. The bearing plate 40 retains the bearings 10 and is held by screw 41. Bolts 12 connect the cover 38, the bearing housing 37 and the rotor housing 6 into a single unit defining therein a volume 18 which is formed into working chambers by the meshing rotors 4 mounted on the shafts 36a and 36b. Additional bolts 13 attach the by-pass valve body 46 to the rotor housing as a bearing cover. The joints between the housing parts are sealed by the O rings 42–45.

A by-pass passage 22 is formed in the by-pass valve cover 46 and communicates with a by-pass 7b of the rotor housing 1 via an inlet by-pass 21b. It also communicates with a by-pass 7a of the rotor housing 1 via an outlet by-pass 21a in which is seated a valve 19. The valve 19 moves freely on the shaft 23 and is forced to the direction to close the passage 21a by a valve spring 20. The shaft 23 is supported on a guide 48 having an air seal 47 and is fixed to a pressure plate 27 forced to the left by a spring 28 in a diaphragm housing. The plate 27 is fixed to a diaphragm 26 having a holder 29. Ports 24 and 25 accept signal pressures in the opposing volumes of the diaphragm 26.

The by-pass valve structure 2 has two functions. According to one of the functions, the excess charging pressure flows from the outlet 17 to the by-pass 21a via the by-pass 7a, presses the valve 19 against the spring 20 and so flows into the by-pass passage 22, flows from the by-pass passage 22 to the by-pass 7b via the by-pass 21b, and is relieved to the inlet 16. Because the valve 19 slides free on the shaft 23, the characteristics of valve-opening are controlled easy by selecting the spring force of the valve spring 20.

According to the other of the functions, when the difference in signal pressures between the signal pressure ports 24, 25 increases, the diaphragm 26, the pressure plate 27, the spring 28, the holder 29 and the shaft 23 move to the right in FIG. 1. The valve 19 then opens due to the pressing of the head of the shaft 23, and the pressure in the outlet 47 is relieved to the inlet 16.

In the invention as above described, excess charging pressure is prevented and damage to the engine and waste of fuel are prevented. Moreover, in driving conditions where charging is not necessary, by increasing the pressure in the port 24 or decreasing the pressure in the port 25, the valve 19 is opened to decrease the driving load of the supercharger and the engine is saved from the excess load.

Because the valve structure is attached to the supercharger in one body, the system is compact and is easily mounted to the engine. Because of the short by-pass, the pass resistance is minimal, the air circulates efficiently during by-pass relief, the driving load of the supercharger is minimal, and the fuel consumption is improved.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A mechanical supercharger comprising:
    a supercharger housing defining a working volume and having an inlet and an outlet;
    compressing means in said working volume and comprising means for compressing a gas between said inlet and said outlet; and
    by-pass means for selectively by-passing a compressed gas from said outlet back to said inlet, comprising:
    (a) a valve body unitarily fixed to said supercharger housing as a single body and having a by-pass passage fluidically connected between said outlet and said inlet for permitting compressed gas to flow from said outlet to said inlet,
    (b) a normally closed valve in said valve body for closing the fluid communication between said outlet and said inlet via said by-pass passage,
    (c) diaphragm means for selectively opening said valve so as to open said by-pass passage,
    (d) spring means for biasing said valve in the normally closed position, whereby said valve opens independently of said diaphragm when an opening force on said valve due to a pressure of said compressed gas at said outlet exceeds a closing force of said spring means, and
    (e) a headed shaft fixed to said diaphragm, said valve being freely slidably mounted on said shaft, whereby said valve slides on said shaft to open when the opening force exceeds the closing force of said spring means, and whereby said valve opens when said diaphragm retracts said shaft such that said valve is engaged by the head of said shaft.

2. The supercharger of claim 1 wherein said compressing means comprises:
    two parallel shafts extending through said supercharger housing and being rotationally mounted thereto, one end of each of said shafts extending to said valve body;
    meshing gears mounted on an other end of said shafts for synchronously rotating said shafts.

3. The supercharger of claim 1 wherein said compressing means comprises:
    two parallel shafts extending through said supercharger housing and being rotationally mounted thereto, one end of each of said shafts extending to said valve body;
    meshing gears mounted on an other end of said shafts for synchronously rotating said shafts.

* * * * *